United States Patent [19]
Aubert

[11] Patent Number: 5,254,818
[45] Date of Patent: Oct. 19, 1993

[54] MICROWAVE MELTING FURNACE FOR THE VITRIFICATION AND/OR DENSIFICATION OF MATERIALS

[75] Inventor: Bruno Aubert, Connaux, France

[73] Assignee: SGN-Societe Generale pour les Techniques Nouvelles, Saint Quentin En Yvelines, France

[21] Appl. No.: 860,071

[22] Filed: Mar. 30, 1992

[30] Foreign Application Priority Data

Apr. 3, 1991 [FR] France .................. 91 04037

[51] Int. Cl.$^5$ .............................. H05B 6/78
[52] U.S. Cl. ............ 219/10.55 A; 219/10.55 F; 219/10.55 M; 219/10.55 R; 34/4; 34/1 P; 264/22; 264/24; 110/333
[58] Field of Search ............... 219/10.55 M, 10.55 A, 219/10.55 F, 10.55 R; 34/1, 3, 4, 12, 57 R; 264/22, 24, 56, 64; 110/333

[56] References Cited

U.S. PATENT DOCUMENTS 3,747,542 7/1973 Ruohola et al. .................. 110/8

FOREIGN PATENT DOCUMENTS 57-751184 8/1982 Japan.
2157062 10/1985 United Kingdom.

*Primary Examiner*—Bruce A. Reynolds
*Assistant Examiner*—Tu Hoang
*Attorney, Agent, or Firm*—Michael N. Meller

[57] ABSTRACT

The furnace according to the invention makes it possible to continuously vitrify and/or densify toxic materials, such a nuclear waste, by using microwaves. The furnace contains two vertical ends connected by a horizontal melting vessel. The materials to be melted and the microwaves are introduced at the first end. The melting vessel has a constant cross-section as a result of a horizontal upper wall in order to aid the distribution of the power of the microwaves over the surface of the molten bath. Preferably, the second end is provided with a piston making it possible to regulate the return of non-absorbed microwaves.

20 Claims, 2 Drawing Sheets

MICROWAVE MELTING FURNACE FOR THE VITRIFICATION AND/OR DENSIFICATION OF MATERIALS

DESCRIPTION

1. Field of the Invention

The invention relates to the definitive storage of toxic materials and in particular radioactive waste from nuclear power stations or from the reprocessing of reprocessed or non-reprocessed irradiated fuels. The invention is also applicable to chemical waste. It more particularly relates to the vitrification of such waste by means of microwave furnaces. It can also be used for densify materials.

2. Prior Art

The storage of toxic waste, such as radioactive waste, causes serious environmental problems. In order to avoid the spread of such materials, a widely known solution consists of immobilizing such waste in materials able to resist various corrosion types in time. Thus, vitrification makes it possible to immobilize such waste in a stable form.

The effect of microwaves on the material is known, because under the action of an alternating electrical field, dielectric materials are oriented first in one direction and then in the other. These polarization cycles lead to heating.

In the field of the vitrification of radioactive waste with the aid of microwaves, it is known to grind the waste and then pour the same into a container located in a microwave furnace. The waste can be constituted by glass, ceramics or ash, as well as asbestos or fibreglass filters. The microwave generator is then started up and the waste is gradually melted. When this is at an end, the container is removed from the furnace.

In general terms, in existing processes, microwave distribution is by a multimodal procedure. This type of operation is advantageous, because it makes it possible to have a sufficiently large furnace and to adequately treat the waste for a discontinuously operating, profitable industrial installation. However, such a means does not make it possible to control the uniformity of the electrical field and therefore the treatment. There is consequently a risk of hot points and consequently uncontolled volatilization, as well as a risk of cold points with the obtaining of solid phases of different natures. The different products then obtained have different properties. The lack of reproducibility of these properties does not make it possible to guarantee the safety of storage.

FIG. 1 shows a melting furnace described in a publication by C. SHIBATA and H. TAMAI, from the review of Microwave Power and Electromagnetic Energy, vol. 25, no. 2, 1990. This furnace is inclined and uses a continuous, monomodal waste melting process.

The furnace comprises a straight upper part 10, by which the microwaves arrive and an inclined lower part 1 forming the melting vessel and therefore containing the melting product 2. The microwaves enter the upper part 10 by means of a waveguide supply 8 issuing by a window 9 perpendicularly into said upper part 10. The product to be melted is stored in a hopper 7 and is fed into the melting furnace 1 by means of a lateral proportioning screw 3. The molten product flows out through an outlet 4 level with the surface of the molten bar 2. The gases are extracted by a stack 5A or 5B, which can be positioned either close to the product supply as is the case for 5A, or on the side of the microwave supply, as is the case for 5B.

Such a means can operate continuously and make it possible to maintain in reserve a molten material mass. After stopping such a furnace, said material mass cools and solidifies. The energy quantity necessary in microwave form for melting said quantity is much lower than if it were the crude feed product.

However, such a means also suffers from the following disadvantages. Such a configuration of the melting vessel 1 means that the distribution of the microwaves over the surface of the molten bath 6 produces an excessive temperature gradient. There is consequently a considerable risk of the blockage of the outlet opening 4. For the unblocking thereof a stoppage is necessary and it may even be necessary to dismantle the furnace 10 or the melting vessel 1.

In order to avoid discharges, the extraction of gases by the outlet 5A must take place in the low power zone with respect to the microwaves, in order to avoid a rising of conductive gases towards the upper part 10 of the furnace, where the highest power is present. In the described embodiment, the outlet for the gases 5A is consequently positioned above the molten bath 2 close to the proportioning screw 3. However, there is then a risk of suction of the product to be melted, if said product is partly constituted by ash. Therefore the gases must be extracted through the outlet 5A at a very low flow rate. It is not then possible to be certain that all the gases present are eliminated.

If the gas outlet is on the opposite side to the outlet by the proportioning screw 3, as is the case for outlet 5B, the latter is very close to the high power zone, so that the discharge risk is significantly increased.

The object of the invention is to obviate these disadvantages by proposing a different furnace and melting vessel structure.

SUMMARY OF THE INVENTION

To this end the invention relates to a microwave melting furnace for the vitrification and/or the densification of materials comprising a furnace body having a lower part constituting a melting vessel, an inlet opening for the materials to be melted, an outlet opening for the melted materials level with de desired molten bath level, a gas outlet and a microwave inlet, as well as a microwave generator connected to the microwave inlet.

According to the invention, the lower part of the furnace has a horizontal upper wall, so as to define a volume, above the molten bath, which has a constant cross-section over most of its possible length, in order to favour a regular distribution of the power supplied by the microwaves to the molten bath.

In the preferred embodiment of the furnace according to the invention, the furnace body is a tube and the lower part constituting the melting vessel is a horizontal part of said tube, the inlet for the materials to be melted and the inlet for the microwaves being placed at a first end of the tube. This construction is advantageously completed by the fact that the second end of the tube is closed by a microwave reflection surface in order to reflect the same towards the molten bath surface.

Preferably, said reflection surface is the end of a piston sliding in the second end of the tube, to permit the regulation of the position of said reflection surface as a function of the wavelength of the microwaves.

In this case, the piston is advantageously completed by a microwave trap constituted by at least one chamber placed behind the reflection surface and issuing into the gap between the piston and the inner wall of the second end of the tube.

In the preferred configuration of the furnace according to the invention, the two tube ends are vertical, the tube having a shape curved into a U or J.

In the preferred embodiment of the furnace according to the invention, monomodal operation has been chosen, the different parts of the tube all having the same cross-section favouring the monomodal propagation of the microwaves.

In order to facilitate the flow of molten materials through the outlet opening and prevent the blockage of the latter, said outlet is wide, thus enabling the microwaves to act on the materials escaping through said opening. It is then advantageous to place the gas outlet on the second end. It is also possible to complete the melting vessel with a water cooling circuit.

Within the framework of the construction of the furnace with two vertical ends, said two ends are connected to the horizontal lower part serving as the melting vessel by double corner bends, thus defining inclined portions between the two corners of a junction. In this case, the tube preferably has a rectangular cross-section with sides A and B with $B=2A$ and with $B \leq L$, L being the wavelength of the microwaves.

Preferably, the angle of inclination of the inclined portion is 45° and the internal C and external D lengths of the inclined portions of the double corner bends are respectively equal to $C=L/4-A \cdot \tan 22°5$ and $D=L/4+A \cdot \tan 22°5$.

LIST OF DRAWINGS

The invention is described in greater detail hereinafter relative to non-limitative embodiments and the attached drawings, wherein show:

FIG. 1 An embodiment of a prior art furnace.
FIG. 2 The furnace according to the invention.

DETAILED DESCRIPTION OF AN EMBODIMENT OF THE INVENTION

Figure 1:
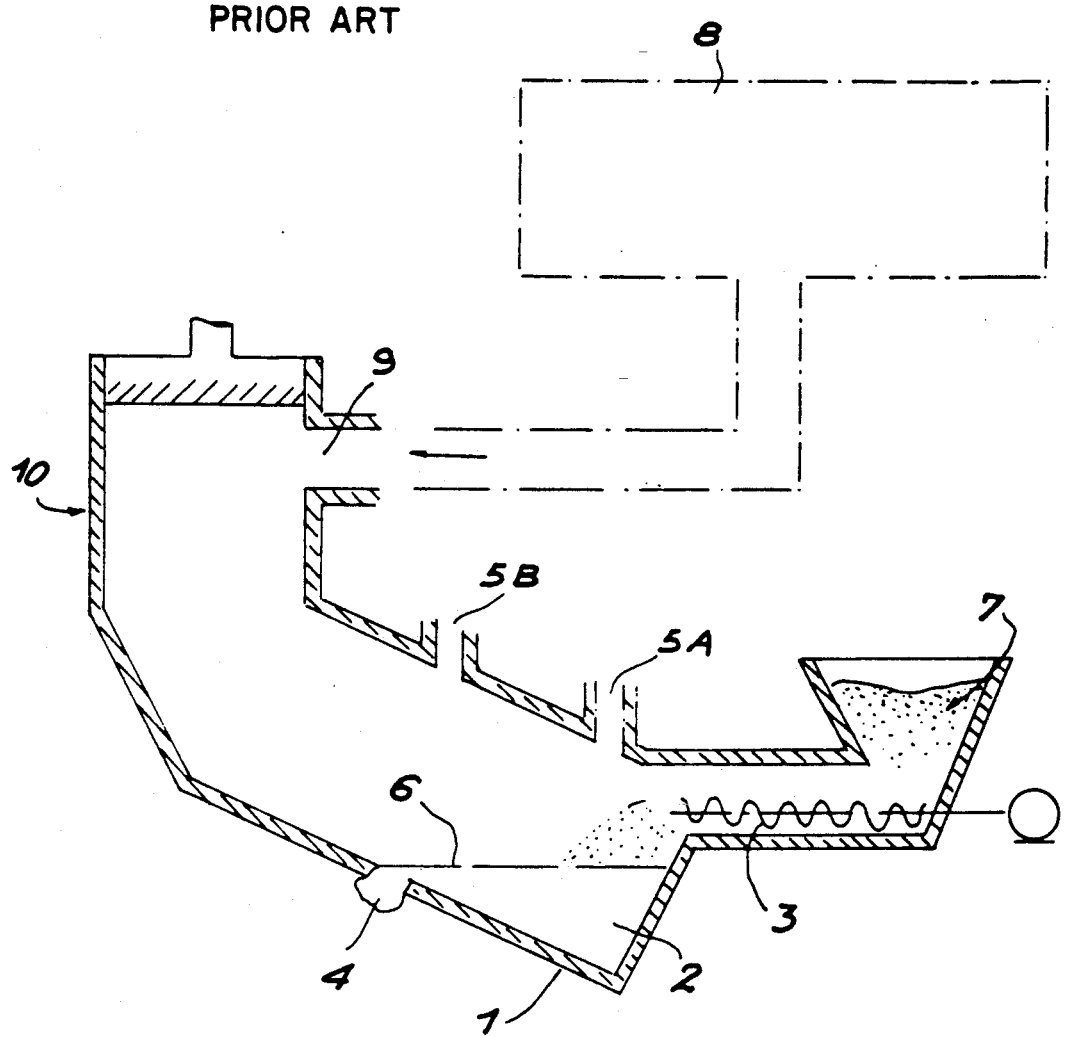
Figure 2:
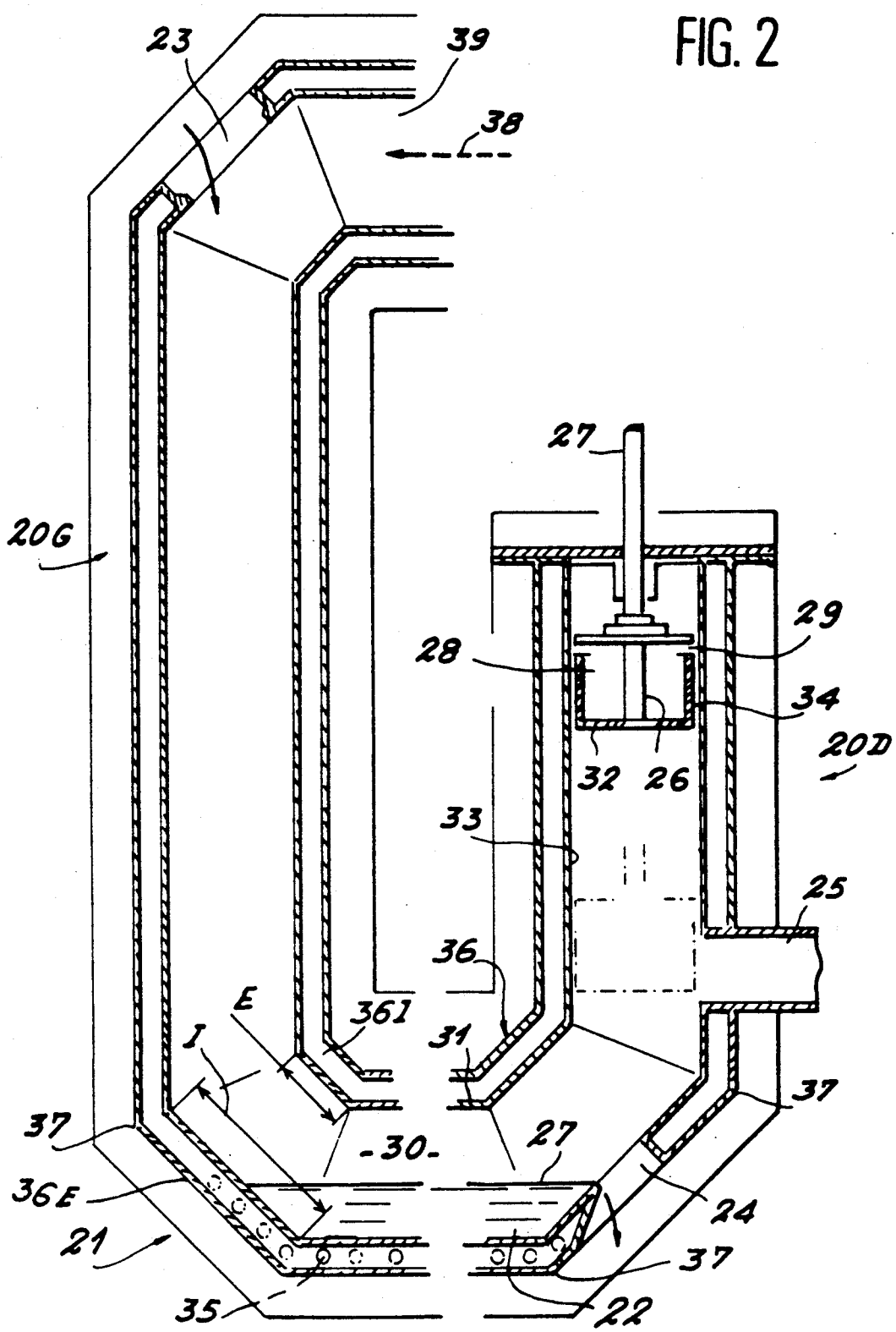

The furnace shown in FIG. 2 has a U-shape, i.e. has two vertical branches connected by a horizontal branch, although this only constitutes an example.

The molten bath 22 is located in the lower part lower part of the burn, which forms a melting vessel. By a first, left-hand end 20G are introduced the materials to be melted. It should be noted that these materials must not be conductive and able to absorb microwaves, in other words having dielectric losses and being materials which are not subject to sublimation, i.e. which do not pass directly from the solid state into the gaseous state. These materials are generally waste materials, more particularly containing oxidized heavy metals. It should also be noted that incineration ash is particularly appropriate for this type of treatment.

In order to improve the efficiency of the microwaves, it is preferable to compact the waste materials prior to their melting. However, it is not necessary to obtain very hard pellets, but simply pellets having an adequate rigidity to permit their handling. The aim of this compacting is also to eliminate the flying away of powder or ash during the introduction of the waste into the furnace and to reduce the quantity of air introduced into said waste. In the embodiment described relative to FIG. 2, the materials to be melted are also introduced by said first left-hand end 20G and more specifically by a feed opening 23 in the upper part of first end 20G. The latter is shown in curved form, but this is not obligatory. This is a shape which is adapted to an installation supplying microwaves which is particularly suitable for this type of melting furnace using a waveguide oriented in a direction symbolized by the horizontal arrow 28 and leading into the upper part of the first end 20G via a microwave supply opening 29.

An essential characteristic of the invention is that the molten bath 22 is located in a horizontal portion of the furnace forming the melting vessel and whose volume permits a uniform distribution of the microwave power over the entire surface 27 of the molten bath 22. In other words, the volume 30 located above the surface 27 of the molten bath 22 and below the upper wall 31 of the lower part serving as the melting vessel has a cross-section favouring the passage and uniform distribution of the microwaves on said surface 27 of the molten bath 22. Therefore the upper wall 31 of the melting vessel 21 is horizontal, the height separating the latter from the surface 27 of the molten bath 22 being constant over most of the length of said surface 27. The two vertically axed lines subdividing said melting vessel 21 into two parts show that the latter can have a variable length, but the upper wall 31 must remain horizontal. The cross-section of the volume 30 above the surface 27 of the molten bath 22 must consequently be constant over most of the length.

In the preferred embodiment of the furnace according to the invention, its body is preferably constituted by a tube surrounding all the successive parts of the furnace. Thus, the first left-hand end 20G is the first end of the tube and is preferably vertical. Following a bend, the tube constitutes the horizontal part which is the melting vessel 21. The microwaves, introduced by the lateral opening 29, into the first end 20G are consequently propagated into the lower part, through the space 30 situated between the surface 27 of the molten bath 22 and the upper wall 31 of the melting vessel 21.

This configuration of the melting vessel 21 makes it possible to utilize one of the secondary technical features of the furnace according to the invention, which is the use of a microwave reflection surface 32, so that the microwaves not absorbed beforehand travel the reverse path, with a view to exploiting the maximum quantity of the microwave power. The efficiency of the microwaves is improved by appropriately regulating the position of the piston 26, particularly by adapting the impedance of the furnace-waste, which varies considerably between the starting of the furnace and the melting of the materials.

A second right-hand end 20D ends the furnace according to the invention and in particular the tube. This second end 20D is shown vertical, in the same way as the left-hand end 20G, although this is only an exemplified embodiment.

The reflection surface 32 is preferably that of a piston 26 mounted so as to slide within the inner wall 33 of the second right-hand end 20D. This makes it possible to regulate the position of said reflection surface 32 as a function of the power and wavelength of the microwaves. It is then sufficient to displace the piston 26 by means of its control rod 27.

It is also possible to equip the piston 26 with two internal cavities 38 having an opening 39 linking the chamber 38 to the possible minimum space remaining between the inner wall 33 of the second end 20D and the lateral outer wall 34 of the piston 26. This constitutes a trap for the microwaves, which would tend to pass into the gap left between the piston 26 and the inner wall 33 of said second end 20D.

An outlet opening for the melted materials 24 is preferably located towards the second right-hand 20D, opposite to the supply side for the solid waste, so as to prevent the discharge of incompletely melted waste.

A gas discharge opening 25 is located at the bottom of said second end 20D, but this is not the only possible arrangement. The position of the gas discharge opening 25 on the second right-hand end 20D of the furnace makes it possible to prevent any spreading of gas into that part of the furnace used for microwave propagation.

Ducts 35 are shown within the walls of the melting vessel 21 to show the preferred presence of a double envelope watercooling circuit. This avoids the intense corrosive effect of the products when melting reaches 1100° C.

As is shown in FIG. 2, the two ends 20G and 20D are connected to the horizontal part forming the melting vessel 21 by means of two double corner bends. Thus, the melting vessel 21 is connected to each of the two ends 20G, 20D by two oblique walls 36I and 36E, which are respectively inner and outer. Each oblique wall 36I and 36E (FIG. 2) defines two corners 37. In this embodiment the inclination of the intermediate walls 36I and 36E is 45°, but this is not limitative.

However, the proportion of the respective distances I of 36I and E of 36E must preferably respect the following formulas, established as a function of the wavelength L of the microwaves:

$$I = L/4 - A \cdot \tan 22°5,$$

and $$E = L/4 + A \cdot \tan 22°5,$$

These proportions are calculated so that the propagation of the microwaves is monomodal or takes place in monomodal manner.

These arrangements are advantageously completed by adopting for all the parts constituting the tube, a rectangular section whose sides A and B are such that $B = 2A$ with $B \leq L$, which is the microwave propagation wavelength in the waveguides.

In the preferred embodiment of the furnace according to the invention, the outlet opening 24 has a particular shape, which is mainly constituted by a relatively wide aperture of said opening. This facilitates the action of the microwaves on the molten materials, which flow through said opening 24, so as to prevent any blocking of the said opening. This size of the outlet opening 24 can be adjusted as a function of the furnace size and the desired flow rate. Reference is made to the presence of an inclined surface 37 giving the cross-section of the outlet opening 24 a downwardly widened shape, so as to favour the outflow of molten materials.

OPERATION OF THE FURNACE ACCORDING TO THE INVENTION

Prior to the first melting campaign, the furnace must be empty. This is followed by the introduction of the materials to be melted, which in this case consist of compacted waste and in an adequate quantity. The waste drops into the melting vessel 21.

The microwave generator is then started up. Such a furnace is particularly suitable for using frequencies between 915 and 2450 MHz, representing power levels of 0.5 to 2 kW/kg of waste to be treated. The temperature of the waste then rises.

Gases are given off and sucked in by the gas outlet opening 25. This discharge of gases is particularly interesting for the conductive gases which may form, such as $CO_2$, or simply hot air. Thus, electric arcs can occur, which is very prejudicial to the satisfactory operation of the furnace.

When the waste has reached the melting point and an adequate quantity thereof is located in the melting furnace, said molten materials flow out through the discharge opening 24. It is then merely necessary to regularly add waste in order to maintain this operation.

It should be noted that the complete melting of the materials may not be obtained as soon as the viscosity of the material being melted is adequate to ensure the discharge of the material. A viscosity of approximately 1000 poises is a limit value beyond which tapping proves difficult.

It is pointed out that it is advantageous to maintain in the melting vessel 21 a quantity of molten material cooled between two campaigns. This reserve makes it possible to reduce the power necessary for reaching the melting point during the start of the second campaign, during preheating.

In connection with the obtaining of a glass, either by treating vitrifiable waste, or by adding components necessary for the formation of a glass combined with the components of the waste, the following specific example can be given.

EXAMPLE OF VITRIFICATION OBTAINED

Waste (incinerator ash) with the following composition was melted:

| | |
|---|---|
| ZnO | 34% |
| CaO | 28% |
| $SiO_2$ | 15.6% |
| $Al_2O_3$ | 11.5% |
| $P_2O_5$ | 4.1% |
| $TiO_2$ | 2.8% |
| MgO | 1.6% |
| $MnO_2$ | 1.3% |
| $Fe_2O_3$ | 0.6% |
| CdO | 0.5% |

This ash simulates the radioactive incinerator ash of radioactive waste. Tapping is obtained for a viscosity of 200 poises. The molten product temperature is 1100° C. The furnace flow rate is 1.8 kg/h. The power of the generator is 5 kW. The frequency used is 2450 MHz.

The embodiment described relates to the vitrification of waste. The furnace according to the invention can also be used for densifying materials such as ceramics, vitroceramics and glasses.

I claim:

1. A microwave melting furnace for vitrification or densification of materials comprising:
    a body having a lower part containing a melting vessel in which a molten bath is to produced,
    a first inlet opening in said body for said materials,
    an outlet opening in said melting vessel for molten materials, said outlet opening placed at the height of a desired level from a surface of said molten bath, and a discharge opening in said body for gases and a second inlet in said body for introducing said microwaves, wherein said melting vessel has an upper horizontal wall to define a volume above said surface of said molten bath, said melting vessel having a substantially constant cross-section to produce a regular distribution of heat supplied by said microwaves to said molten bath.

2. Furnace according to claim 1, wherein said body is a tube, containing said melting vessel being a horizontal part of said tube, said first inlet opening for said materials and said second inlet opening for said microwaves are on a first end of said tube.

3. Furnace according to claim 2, wherein said tube has a second end closed by a microwave reflective surface for reflecting non-absorbed microwaves onto said surface of said molten bath.

4. Furnace according to claim 3, wherein said microwave reflective surface is an end of a piston sliding in said second end of said tube to permit regulation of the position of said microwave reflective surface as a function of the wavelength (L) of said microwaves.

5. Furnace according to claim 3, wherein said piston includes a microwave trap containing at least one chamber positioned behind said microwave reflective surface and issuing by a hole into a gap left between said piston and an inner wall of said second tube end.

6. Furnace according to claim 3 wherein said first and second ends are vertical, the tube having a U or J-curved shape.

7. Furnace according to claim 2, wherein different parts of said tube all have the same cross-section.

8. Furnace according to claim 7, wherein the cross-section of said different parts of said tube is rectangular with a first side having a width twice that of a second side and said first side having a width substantially less than the wavelength of the microwaves.

9. Furnace according to claim 1, wherein said outlet opening for the molten materials is wide, to permit the action of said microwaves on said materials flowing out therefrom, to prevent blocking of said outlet opening.

10. Furnace according to claim 3, wherein said discharge opening for gases is placed on said second tube end.

11. Furnace according to claim 1, wherein said melting vessel is surrounded by a liquid cooling duct.

12. Furnace according to claim 6, wherein said first and second ends of said tube are connected to a lower horizontal part serving as said melting vessel by double corner bends defining inclined portions between two corners.

13. Furnace according to claim 12, wherein the angle of inclination of said inclined portions is 45° and the internal (I) and external (E) lengths of the inclined double corner bend portions are, respectively:

$$I = L/4 - A \cdot \tan 22°5$$

and $$E = L/4 + A \cdot \tan 22°5$$

wherein said tube has a rectangular cross-section where A corresponds to a smaller side dimension of said tube and L is the wavelength of said microwaves.

14. Furnace according to claim 4, wherein said first and second ends of said tube are vertical, U or J-curved shape.

15. Furnace according to claim 5, wherein said first and second ends of said tube are vertical, U or J-curved shape.

16. Furnace according to claim 3, wherein different parts of the tube all have the same cross-section to allow monomodal propagation of said microwaves.

17. Furnace according to claim 14, wherein different parts of said tube all have the same cross-section.

18. Furnace according to claim 17, wherein said cross-section of said different parts of said tube is rectangular with sides A and B in which $B = 2A$ and $B < L$, L being the wavelength of said microwave.

19. Furnace according to claim 2, wherein said outlet opening for said molten materials is wide, to permit the action of said microwaves on said materials flowing out therefrom, to prevent blocking of said outlet opening.

20. Furnace according to claim 2, wherein said melting vessel is surrounded by a cooling duct.

* * * * *